US011280175B2

(12) United States Patent
Rowe

(10) Patent No.: US 11,280,175 B2
(45) Date of Patent: Mar. 22, 2022

(54) DETERMINING THE VOLUME OF CUTTINGS

(71) Applicant: Halliburton Energy Services, Inc., Houston, TX (US)

(72) Inventor: Mathew Dennis Rowe, Spring, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 459 days.

(21) Appl. No.: 16/538,420

(22) Filed: Aug. 12, 2019

(65) Prior Publication Data

US 2021/0047911 A1 Feb. 18, 2021

(51) Int. Cl.
*E21B 47/00* (2012.01)
*E21B 47/002* (2012.01)
*E21B 47/12* (2012.01)
*G06T 7/62* (2017.01)

(52) U.S. Cl.
CPC ............ *E21B 47/002* (2020.05); *E21B 47/12* (2013.01); *G06T 7/62* (2017.01)

(58) Field of Classification Search
CPC ........ E21B 47/002; E21B 47/08; E21B 47/12; G01N 9/26; G06T 7/62
See application file for complete search history.

(56) References Cited

U.S. PATENT DOCUMENTS

| | | | |
|---|---|---|---|
| 4,412,130 A * | 10/1983 | Winters | G01V 5/12 250/260 |
| 6,357,536 B1 | 3/2002 | Schrader et al. | |
| 6,662,884 B2 * | 12/2003 | Hemphill | E21B 21/00 175/46 |
| 6,665,636 B1 * | 12/2003 | Allouche | E21B 21/06 175/206 |
| 9,228,430 B2 | 1/2016 | Rasmus et al. | |

(Continued)

FOREIGN PATENT DOCUMENTS

| | | | | |
|---|---|---|---|---|
| RU | 2672075 C1 * | 11/2018 | | E21B 49/005 |
| WO | 2018-076006 | 4/2018 | | |
| WO | WO-2019108183 A1 * | 6/2019 | | G01N 33/2823 |

OTHER PUBLICATIONS

Smith et al. "Measuring Drilled Cuttings and Fluid Recovery by Real Time Mass Balance," SPE-189616-MS (Year: 2018).*

(Continued)

*Primary Examiner* — John Fitzgerald
(74) *Attorney, Agent, or Firm* — Benjamin Ford; C. Tumey Law Group PLLC

(57) ABSTRACT

A method for identifying cuttings volume may comprise taking one or more inlet measurements of a drilling fluid at an inlet meter before the drilling fluid is circulated into a wellbore, taking one or more outlet measurements of a drilling fluid at an outlet meter after the drilling fluid is returned from the wellbore with cuttings, subtracting the one or more inlet measurements from the one or more outlet measurements and adding hole fill to determine mass of the cuttings, identifying a density of the cuttings, and converting the mass of the cuttings to the volume of the cuttings using the density of the cuttings. A system may comprise an inlet meter, an outlet meter, a pump for circulating a drilling fluid and one or more cuttings through the inlet meter and the outlet meter, and an information handling system.

20 Claims, 2 Drawing Sheets

(56) References Cited

U.S. PATENT DOCUMENTS

| | | | |
|---|---|---|---|
| 9,651,468 B2* | 5/2017 | Rowe | E21B 43/16 |
| 10,060,209 B2* | 8/2018 | Lien | E21B 21/065 |
| 10,577,912 B2* | 3/2020 | Torrione | E21B 21/065 |
| 10,884,151 B2* | 1/2021 | Pedrycz | G01V 1/48 |
| 10,954,729 B2* | 3/2021 | Torrione | E21B 21/065 |
| 11,060,399 B2* | 7/2021 | Jamison | E21B 21/08 |
| 2003/0079912 A1 | 5/2003 | Leuchtenberg | |
| 2013/0090855 A1* | 4/2013 | Rasmus | E21B 21/08 |
| | | | 702/9 |
| 2014/0333754 A1 | 11/2014 | Graves et al. | |
| 2017/0131429 A1 | 5/2017 | Schneider | |
| 2017/0145822 A1* | 5/2017 | Rowe | E21B 49/003 |
| 2019/0226323 A1* | 7/2019 | Pedrycz | G01V 1/48 |
| 2019/0309614 A1* | 10/2019 | Benson | E21B 7/04 |
| 2020/0157929 A1* | 5/2020 | Torrione | E21B 44/00 |
| 2020/0270958 A1* | 8/2020 | Omrani | E21B 37/00 |
| 2021/0189813 A1* | 6/2021 | Torrione | E21B 47/04 |

OTHER PUBLICATIONS

International Search Report and Written Opinion for Application No. PCT/US2019/046226, dated May 12, 2020.
Schlumberger, Clear—Hole Cleaning and Wellbore Risk Reduction Service, 2015.
Schlumberger, Flag—Fluid Loss and Gain Detection Service, 2013.
GeoLog Surface Logging, DrillClean, Real-Time Monitoring Service for Borehole Cleaning and Stability, Nov. 2018.

* cited by examiner

DETERMINING THE VOLUME OF CUTTINGS

BACKGROUND

Boreholes drilled into subterranean formations may enable recovery of desirable fluids (e.g., hydrocarbons) using a number of different techniques. During drilling of an oil or gas well, drilling fluids are circulated through the wellbore. The drilling fluids perform a variety of functions including cooling the drill bit, sweeping away cuttings from the bottom of the wellbore, and maintaining hydrostatic pressure to prevent blowouts or collapse of the wellbore.

As a drilling fluid passes through the wellbore, properties of the drilling fluid may change as a result of downhole conditions. For example, the drilling fluid's density may change due to entrainment of gas or "cuttings," pieces of rock from the subsurface formation. By monitoring and analyzing the changes undergone by the drilling fluid as it passes through the wellbore, personnel may gain insight into the effectiveness of the drilling operations and optimize the drilling operations accordingly. Further, analysis of drilling fluids may significantly improve the overall safety of drilling operations by allowing drilling operators to identify problematic conditions before they endanger equipment, personnel, or the environment.

BRIEF DESCRIPTION OF THE DRAWINGS

For a detailed description of the preferred examples of the disclosure, reference will now be made to the accompanying drawings in which.

DETAILED DESCRIPTION

The present disclosure relates generally to a system and method for determining cuttings volume. Currently, there may be many issues associated with directly measuring the volume of cuttings. For example, smaller particle cuttings may be hard to account for and measure and "wet" cuttings may throw off volume measurements. Mass measurements may be a reliable measurement that may be utilized by an information handling system to identify the volume of cuttings.

Recent developments in metering technology can improve the ability of drilling operators to collect drilling fluid data during drilling operations. For example, the introduction of Coriolis meters suitable for drilling fluids and sized for the flow requirements of drilling operations have enabled drilling operators to measure flow rate and density of drilling fluids in real time. Given this increased availability of drilling fluid data, new methods and systems may be utilized to determine cuttings volume.

Figure 1:
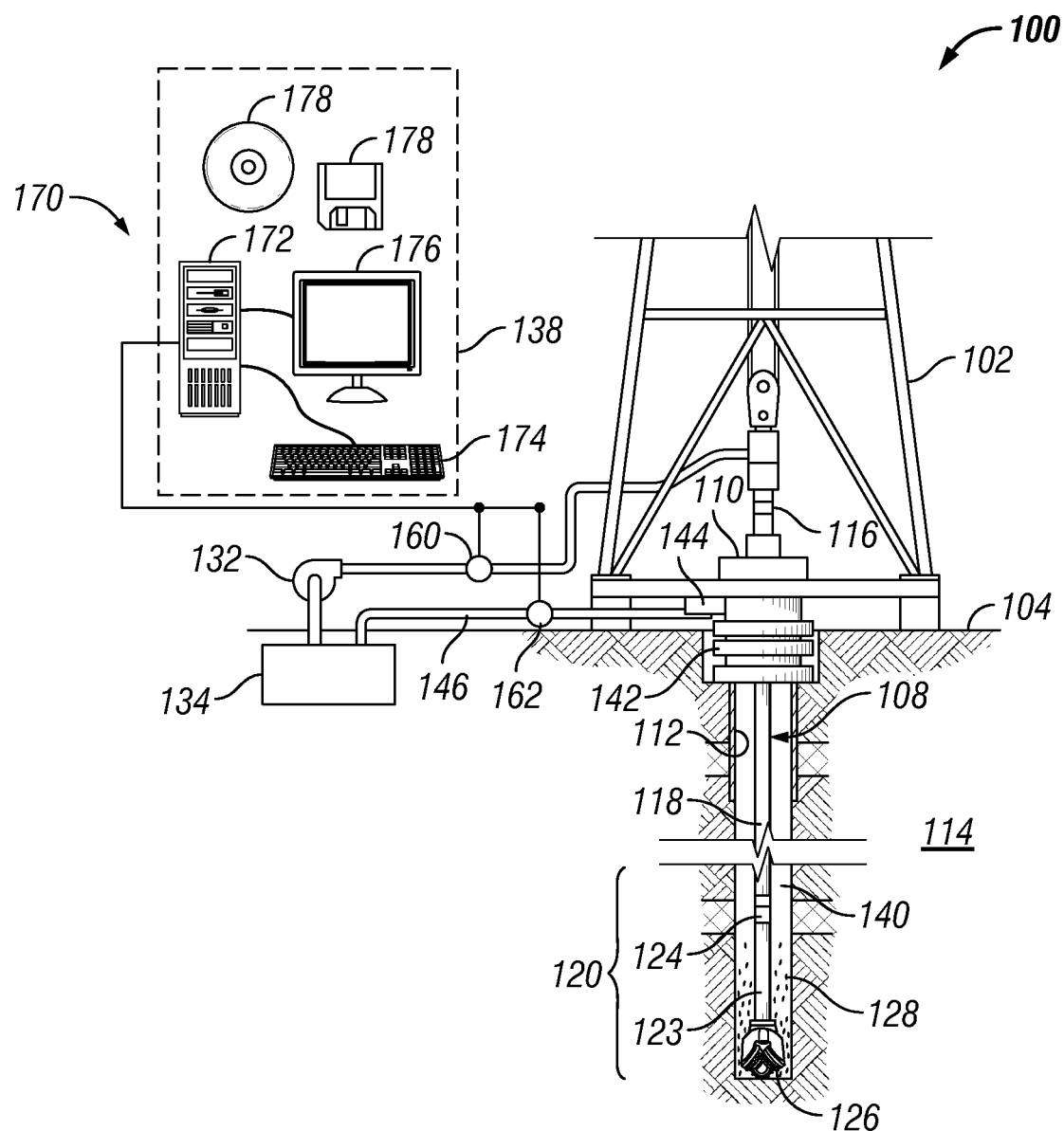
FIG. 1 illustrates a system for drilling operations.

FIG. 1 is an example of a drilling system 100 further including a system for monitoring drilling fluids. A drilling system 100 includes a drilling rig 102 located at a surface 104 of a borehole 112. A hollow drill string 108 is supported by drill rig 102 and penetrates surface 104 into a subsurface formation 114 through a rotary table 110. Rotary table 110 rotates the drill string 108. Drill string 108 includes a Kelly 116, a drill pipe 118 and a bottom hole assembly 120 located at the lower portion of drill pipe 118. Bottom hole assembly 120 may include a drill collar 123, a downhole tool 124 and a drill bit 126. Downhole tool 124 may be any of a number of different types of tools including measurement while drilling (MWD) tools or logging while drilling (LWD) tools. Any or all of the drilling operations may be performed by a drilling personnel or automatically by a control system 138.

In addition to downhole tool 124, drill string 108 may include sensors (not illustrated) for monitoring and measuring different downhole parameters. These parameters may include temperature and pressure of borehole 112, the resistivity, density, or porosity of the surrounding formation, and the size, shape, and alignment of borehole 112, and/or any other property of interest.

During drilling operations, drill string 108 is rotated by rotary table 110. The rotation of drill string 108 causes drill bit 126 to remove material from the subsurface formation 114, the removed material forming "cuttings" 128 within borehole 112. In examples, drill string 108 may lower bottom holes assembly 120 in borehole 112. Generally, borehole 112 may include horizontal, vertical, slanted, curved, and other types of borehole geometries and orientations. As illustrated, borehole 112 may extend through formation 114. As illustrated in FIG. 1, borehole 112 may extend generally vertically into the formation 114, however borehole 112 may extend at an angle through formation 114, such as horizontal and slanted boreholes. For example, although FIG. 1 illustrates a vertical or low inclination angle well, high inclination angle or horizontal placement of the well and equipment may be possible. It should further be noted that while FIG. 1 generally depicts a land-based operation, those skilled in the art may recognize that the principles described herein are equally applicable to subsea operations that employ floating or sea-based platforms and rigs, without departing from the scope of the disclosure.

As part of drilling operations, a drilling fluid may be circulated through borehole 112. In examples, the drilling fluid is pumped by a drilling fluid pump 132 into drill string 108 from a drilling fluid reservoir 134. The drilling fluid travels through the hollow interior of drill string 108, through drill bit 126, and into borehole 112. The drilling fluid returns to the surface via an annulus 140 formed by drill string 108 and borehole 112. At the surface, borehole 112 may be capped by a blowout preventer 142 having a bell nipple 144. After passing through bell nipple 144, the drilling fluid may travel through an outlet pipe 146 to a storage or containment pond or to reservoir 134 for use in later drilling operations. Cuttings and other impurities may be removed from the drilling fluid by filtration or by allowing the cutting or impurities to settle out of the fluid.

Drilling fluid may be circulated through borehole 112 to perform various functions, including supporting drill string 108, cooling and lubricating drill bit 126, maintaining hydrostatic pressure on subsurface formation 114 and formation fluids to prevent well blowouts, improving the stability of borehole 112, and removing cuttings 128 from borehole 112. The drilling fluid may be formulated to perform one or more functions particularly effectively. For example, "sweep" is a high-density drilling fluid formulated for improved removal of cuttings 128.

Control system 138 may monitor one or more properties of the drilling fluid as the drilling fluid enters and exits borehole 112. The property may be any measurable property of the fluid, including properties that are known to change as the drilling fluid passes through borehole 112. For example, mass, volume, and density are each properties of the drilling fluid that may change as the fluid passes through the borehole due to, among other things, cuttings becoming entrained in the fluid.

To monitor the fluid properties, drilling system 100 may include an inlet meter 160 located, without limitation, between drilling fluid pump 132 and drill string 108 and an outlet meter 162 located between borehole 112 and reservoir 134. Additionally, inlet meter 160 may be located between a charging pump (not shown) and main pumps or before the charging pump. In examples, at least one inlet meter 160 and outlet meter 162 are a type of meter capable of simultaneously measuring two or more of mass flow rate, volumetric flow rate, and density. For example, a Coriolis meter, which may be configured to simultaneously measure mass flow rate and density may be used as inlet meter 160 and outlet meter 162. Additionally, one or more sensors may be used at inlet meter 160 and/or outlet meter 162 to measure mass and volume flow with density. In examples, measurements taken by inlet meter 160 may be replaced by a calculated value based on speed and size of drilling fluid pump 132 and tabulated or historical data of drilling fluid properties.

Inlet meter 160 and outlet meter 162 may be installed as close to the borehole as is practical. Doing so generally lessens any influence on the fluid properties not directly related to passage through borehole 112. Equipment present in drilling system 100 may limit or make certain placements of inlet meter 160 and outlet meter 162 more convenient. For example, when a blowout preventer 142 is present, outlet meter 162 may be easier to install and maintain if installed at bell nipple 144 instead of in piping downstream of blowout preventer 142.

Control system 138 may be centralized or distributed and may include, at least in part, one or more information handling system 170. While shown at surface 104, information handling system 170 may also be located at another location, such as remote from borehole 112. Information handling system 170 may include any instrumentality or aggregate of instrumentalities operable to compute, estimate, classify, process, transmit, receive, retrieve, originate, switch, store, display, manifest, detect, record, reproduce, handle, or utilize any form of information, intelligence, or data for business, scientific, control, or other purposes. For example, an information handling system 170 may be a processing unit 172, a network storage device, or any other suitable device and may vary in size, shape, performance, functionality, and price. Information handling system 170 may include random access memory (RAM), one or more processing resources such as a central processing unit (CPU) or hardware or software control logic, ROM, and/or other types of nonvolatile memory. Additional components of the information handling system 170 may include one or more disk drives, one or more network ports for communication with external devices as well as an input device 174 (e.g., keyboard, mouse, etc.) and video display 176. Information handling system 170 may also include one or more buses operable to transmit communications between the various hardware components.

Alternatively, systems and methods of the present disclosure may be implemented, at least in part, with non-transitory computer-readable media 178. Non-transitory computer-readable media 178 may include any instrumentality or aggregation of instrumentalities that may retain data and/or instructions for a period of time. Non-transitory computer-readable media 178 may include, for example, storage media such as a direct access storage device (e.g., a hard disk drive or floppy disk drive), a sequential access storage device (e.g., a tape disk drive), compact disk, CD-ROM, DVD, RAM, ROM, electrically erasable programmable read-only memory (EEPROM), and/or flash memory; as well as communications media such as wires, optical fibers, microwaves, radio waves, and other electromagnetic and/or optical carriers; and/or any combination of the foregoing.

In examples, control system 138 may perform one or more of a variety of functions including controlling drilling equipment, collecting data from sensors, retrieving data from logs or look-up tables, performing calculations on the collected or retrieved data for analysis, monitoring the drilling operations, communicating data to other computers or control systems via a local network or the internet, and storing data in a database or other similar form of collected data. Without limitation, personnel may access control system 138 through a graphical user interface (GUI) as presented to the drilling operator on video display 176. In examples, the GUI may dynamically display data in real-time. The GUI may also display historical data, enabling an operator to review data collected earlier in the drilling operation or during other drilling operations. The GUI may display graphs, charts, or other forms of data that may be manipulated or customized by the user or a system administrator to emphasize particular data of interest. For example, the user may add trend lines, change colors, or limit the data to a specific period of the drilling operations.

Figure 2:
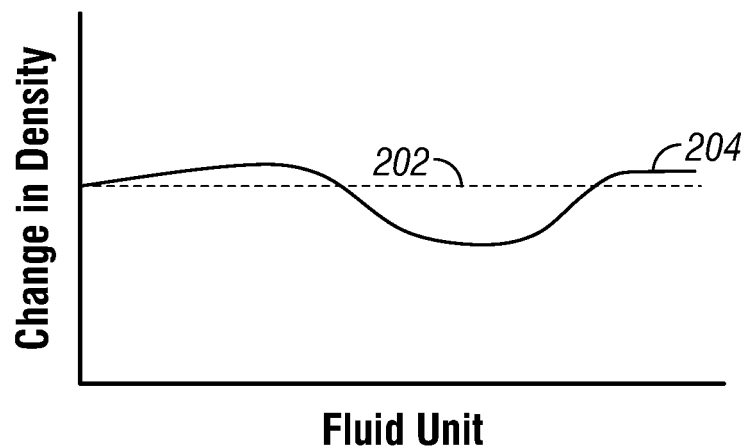
FIG. 2 illustrates a graph depicting changes in density of a series of fluid units.

FIG. 2 depicts an example of a graph that may be presented by the GUI on video display 176 (e.g., referring to FIG. 1). As illustrated, the graph in FIG. 2 depicts an expected change in density 202 and a measured change in density 204 of a series of fluid units. Notably, the density measurements are depicted as being associated with specific fluid units and are independent of time. By associating measurements with fluid units instead of time, personnel may account for interruptions or delays in drilling operations that may impact measurements. The measured change in density 204 may be obtained, for example, using inlet meter 160 and outlet meter 162.

FIG. 2 also illustrates how the system may detect ballooning. Similar to a balloon that is inflated and then releases air when inflation stops, ballooning occurs when pumped fluids are taken in by the formation and then returned to borehole 112 (e.g., referring to FIG. 1) once pumping stops. As depicted in FIG. 2, when fluids are returned to borehole 112, fluid units may become diluted as indicated by a decrease in density.

Referring back to FIG. 1, during drilling operations, information from bottom hole assembly 120 may be gathered and/or processed by information handling system 170. For example, signals recorded by bottom hole assembly 120 may be stored in memory and then processed by bottom hole assembly 120. The processing may be performed real-time during data acquisition or after recovery of bottom hole assembly 120. Processing may alternatively occur downhole or may occur both downhole and at the surface. In some examples, signals recorded by bottom hole assembly 120 may be conducted to information handling system 170 by way of drill string 108. Information handling system 170 may process the signals, and the information contained therein may be displayed for an operator to observe and stored for future processing and reference. Information handling system 170 may also contain an apparatus for supplying control signals and power to bottom hole assembly 120.

As discussed below, methods may utilize an information handling system 170 to determine volume of cuttings 128 from mass and volumetric measurements from inlet meter 160 and/or outlet meter 162. The volume form cuttings 128 may be displayed on video display 176, which may provide information as to where cuttings 128 may original in borehole 112 and may further utilize measurements to determine if an alarm may be warranted to alert personnel to possible hazards to drilling operations.

Utilizing measurements from bottom hole assembly 120, information handling system 170 may be able to determine the depth that cuttings 128 come from by recording and processing measurements from bottom hole assembly 120 as to bit depth and lag of the bit. In examples, bit depth may come from determining the amount of pipe in drill string 108. For example, this may be done by counting the number of joints of pipe in borehole 112 and knowing the length of all the joints. Monitoring the draw works and determining how much the block has traveled while adding pipe to drill string 108. Draw works is defined as the primary hoisting machinery component of a rotary drilling rig, which functions by raising and lowering the traveling block on the rotary drilling rig. Lag may be determined by knowing the location of the bit from taken measurements, knowing the pump rate in either strokes or volume per min from taken measurements, and/or knowing the volume of the annulus from taken measurements.

Measurements from bottom hole assembly 120 may allow for identifying the volume of formation 114 by determining when a foot of formation 114 is drilled and knowing the bit and reamer size utilized. Additionally, by knowing lag, the return of this volume of rock to surface may be known. Information handling system 170 may display these measurements for review by personnel. Additionally, information handling system 170 may process the measurements to determine cuttings volume.

For example, cuttings volume may be found through a mass balance using the equation below:

$$f_o = f_I - H_F C_s \quad (1)$$

In Equation (1) $f_I$ is defined as flow in, which may include the mass/volume of drilling fluid. $H_F$ is defined as replacement drilling fluid that is needed to replace drilling fluid due to hole fill. Hole fill is defined as the drilling fluid left in borehole 112 (e.g., referring to FIG. 1) during circulation. $C_s$ is defined as cutting returning to the surface. In examples, $f_o$ is defined as flow out and may include several parts. From Equation (1), the flow out is determined.

Due to the Law of Conservation of Mass, $f_I'$ is defined as a mass basis that is either estimated or measured. $H_F'$ is defined as a function of bit size, receiver size, and rate of penetration. In examples, $H_F'$ in mass could be identified through density. Additionally, $C_s'$ may find the mass of cuttings depending on the tools used during operations. For example, bulk density may be used to determine the mass of cutting in wireline operations or logging while drilling operations. Additionally, the mass of the cuttings may be found through elemental or mineralogical tools to estimate the bulk density. Further, mud loggers may use lithology with average and/or minimum and/or maximum density for formation to calculate weighted density.

During operations, the volume of cuttings produced during drilling is known, which allows for:

$$f_o' = f_I' + H_F' = C_s' \quad (2)$$

in mass $$f_o = f_I + H_F = C_s \quad (3)$$

in volume, where $$C_s' = C_s \quad (4)$$

for cuttings. Equation (4) puts forth that Mass of cuttings = (Volume of Cuttings) (Density of Cuttings).

If drilling system 100 (e.g., referring to FIG. 1) is used in a mass meter method the volume of the cuttings may be calculated as:

$$H_F = C_s \quad (5)$$

as the volume of the hole created during drilling operations that may be filed with mud. From this information, information handling system 170 may activate alarms to hazardous conditions that may be found from these measurements in a drilling operation.

For example, information handling system 170 may issue an alarm if a sensor reading or a calculation result falls outside of a predetermined range of safe values. In response to the alarm, personnel may manually modify drilling operations to avoid potential harm to equipment, personnel, and the environment. For example, the alarm may issue if the measured volume of cuttings 128 is outside of calculated volume for cuttings 128. By way of further example, the alarm may issue if measured mass of cuttings 128 is outside of calculated mass for cuttings 128. Alternatively, information handling system 170 or drilling equipment may automatically respond to the alarm by entering into an alternate mode of operation directed to resolving the abnormal condition. If the abnormal condition is not removed after a certain period of time, worsens, or is sufficiently outside of normal operating conditions, information handling system 170 may send an emergency shutdown signal, stopping certain pieces of drilling equipment or halting drilling operations altogether.

Alarms may be issued for any number of hazardous conditions. Without limitation, an alarm may be issued by information handling system 170 if the measured volume of cuttings 128 discrete or cumulative is less than calculated. In such an example, an alarm or notification may indicate that there is a buildup of cutting 128 in borehole 112 indicating that cleaning efforts of borehole 112 may need to increase. Poor hole cleaning may lead to a pack off or an increase in bottom hole pressure and possible formation fracture. Additionally, if the measured volume of cutting 129 discrete or cumulative is less than calculated an alarm or notification may indicate that the drill bit and/or reamer has reduced in diameter, which may lead to a possible bit trip to replace the drill bit and/or reamer.

Another hazardous condition may be if the measured volume of cuttings discrete or cumulative is greater than calculated. An alarm or notification may indicate that borehole 112 may be collapsing and mitigating efforts need to be taken to stabilize borehole 112. Additionally, an alarm or notification may indicate pore pressure issues which may be prevented by increasing the weight of drilling fluid mud.

Figure 3:
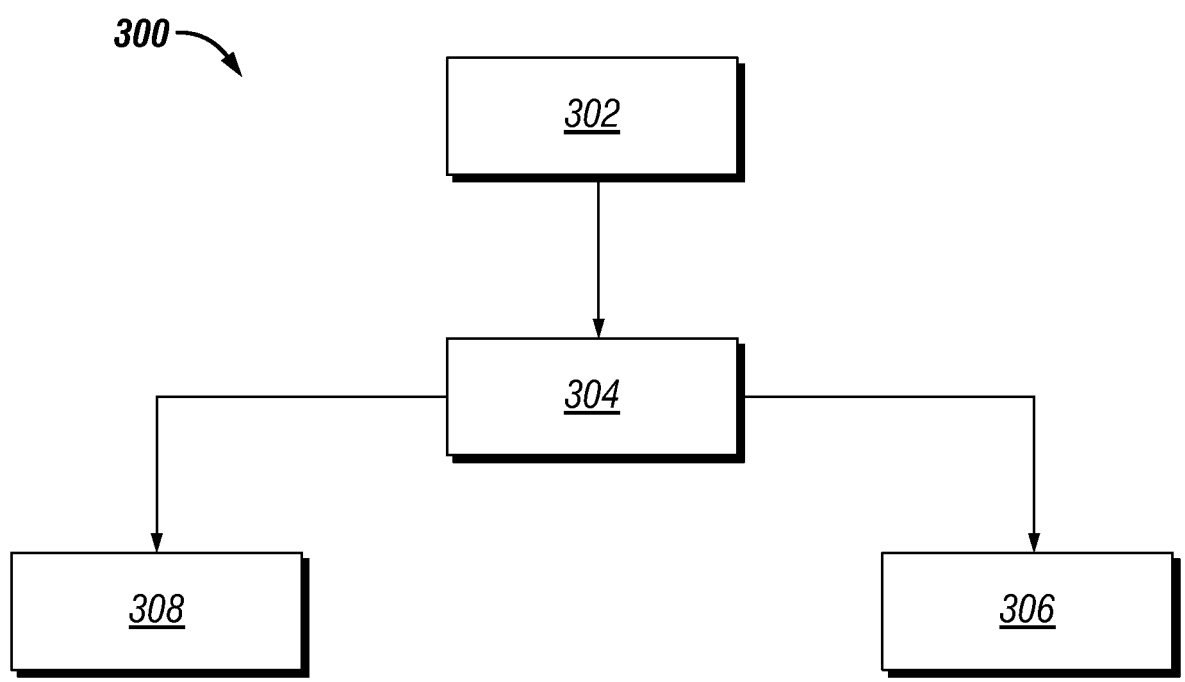
FIG. 3 illustrates a workflow for identifying the volume of cuttings.

FIG. 3 illustrates workflow 300 for identifying the volume of cuttings 128 (e.g., referring to FIG. 1). In block 302, a drilling operation is performed by drilling system 100 (e.g., referring to FIG. 1) in which measurements may be taken at an inlet meter 160 and outlet meter 162 (e.g., referring to FIG. 1). In block 304, measurements may be processed by an information handling system 170 (e.g., referring to FIG. 1) to identify the volume of cuttings 128. As discussed above, the volume of cuttings 128 may be found from Equations 1-6. After determining the volume of cuttings 128, information handling system 170 may compare the measured volume of cuttings 128 to a predetermined range of safe values in block 304. If the volume of cuttings 128 fall outside the range of safe values an alarm may be issued by information handling system 170, as described above, in block 306. If the volume of cuttings 129 fall inside the range of safe values than drilling operations proceed as normal in block 308.

Statement 1. A method for identifying cuttings volume may comprise taking one or more inlet measurements of a drilling fluid at an inlet meter before the drilling fluid is circulated into a wellbore, wherein the one or more inlet measurements comprise a mass in and a volume in of the drilling fluid, taking one or more outlet measurements of a drilling fluid at an outlet meter after the drilling fluid is returned from the wellbore with cuttings, wherein the one or more outlet measurements comprise a mass out and a volume out of the drilling fluid, subtracting the one or more inlet measurements from the one or more outlet measurements and adding hole fill to determine mass of the cuttings, identifying a density of the cuttings, and converting the mass of the cuttings to the volume of the cuttings using the density of the cuttings.

Statement 2. The method of statement 1, wherein the hole fill is a function of bit size, reamer size, and rate of penetration.

Statement 3. The method of statement 2, wherein the hole fill is equal to the mass of the cuttings.

Statement 4. The method of statement 1 or 2, wherein the one or more inlet measurements and one or more outlet measurements are taken by one or more sensors configured to measure mass and volume flow with density at the inlet meter or the outlet meter.

Statement 5. The method of statements 1, 2, or 4, wherein the mass of the cuttings is found from a bulk density.

Statement 6. The method of statements 1, 2, 4, or 5, wherein the identifying the density of the cuttings is found from estimating a bulk density from an element or a mineralogical tool.

Statement 7. The method of statements 1, 2, 4, 5, or 6, wherein the identifying the density of the cuttings is found from using lithology with an average formation density.

Statement 8. The method of statements 1, 2, or 4-7, wherein the identifying the density of the cuttings is found from using lithology with a minimum and maximum formation density.

Statement 9. The method of statements 1, 2, or 4-8, further comprising issuing an alarm if the volume of the cuttings is outside of a calculated range.

Statement 10. The method of statements 1, 2, or 4-9, wherein the identifying the drilling fluid flowing out of a drilling system is found by subtracting replacement drilling fluid from the mass and the volume of the drilling fluid and adding the mass of the cuttings.

Statement 11. A system may comprise an inlet meter, configured to take one or more inlet measurements of a drilling fluid at an inlet meter before the drilling fluid is circulated into a wellbore, wherein the one or more inlet measurements comprise a mass in and a volume in of the drilling fluid, an outlet meter configured to take one or more outlet measurements of a drilling fluid at an outlet meter after the drilling fluid is returned from the wellbore with cuttings, wherein the one or more outlet measurements comprise a mass out and a volume out of the drilling fluid, a pump for circulating a drilling fluid and one or more cuttings through the inlet meter and the outlet meter, and an information handling system. The information handling system is configured to subtract the one or more inlet measurements from the one or more outlet measurements and adding hole fill to determine mass of the cuttings, identify a density of the cuttings, and convert the mass of the cuttings to the volume of the cuttings using the density of the cuttings.

Statement 12. The system of statement 11, wherein the hole fill is a function of bit size, reamer size, and rate of penetration.

Statement 13. The system of statement 12, wherein the hole fill is equal to the mass of the cuttings.

Statement 14. The system of statements 11 or 12, wherein the one or more inlet measurements and one or more outlet measurements are taken by one or more sensors configured to measure mass and volume flow with density at the inlet meter or the outlet meter.

Statement 15. The system of statements 11, 12, or 14, wherein the information handling system is configured to identify the mass of the cuttings from a bulk density.

Statement 16. The system of statements 11, 12, 14, or 15, wherein the information handling system is configured to identify the density of the cuttings from estimating a bulk density from an element or a mineralogical tool.

Statement 17. The system of statements 11, 12, or 14-16, wherein the information handling system is configured to identify the density of the cuttings using lithology with an average formation density.

Statement 18. The system of statements 11, 12, or 14-17 wherein the information handling system is configured to identify the density of the cuttings from using lithology with a minimum and maximum formation density.

Statement 19. The system of statements 11, 12, or 14-18, wherein the information handling system is further configured to issue an alarm if the volume of the cuttings is outside of a calculated range.

Statement 20. The system of statements 11, 12, or 14-19, wherein the information handling system is configured to identify the drilling fluid flowing out of the drilling system by subtracting replacement drilling fluid from the mass and the volume of a drilling fluid and adding the mass of the cuttings.

Although the present disclosure and its advantages have been described in detail, it should be understood that various changes, substitutions, and alterations may be made herein without departing from the spirit and scope of the disclosure as defined by the appended claims. The preceding description provides various examples of the systems and methods of use disclosed herein which may contain different method steps and alternative combinations of components. It should be understood that, although individual examples may be discussed herein, the present disclosure covers all combinations of the disclosed examples, including, without limitation, the different component combinations, method step combinations, and properties of the system. It should be understood that the compositions and methods are described in terms of "comprising," "containing," or "including" various components or steps, the compositions and methods can also "consist essentially of" or "consist of" the various components and steps. Moreover, the indefinite articles "a" or "an," as used in the claims, are defined herein to mean one or more than one of the element that it introduces.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present examples are well adapted to attain the ends and advantages mentioned as well as those that are inherent therein. The particular examples disclosed above are illustrative only, and may be modified and practiced in different but equivalent manners apparent to those skilled in the art having the benefit of the teachings herein. Although individual examples are discussed, the disclosure covers all combinations of all of the examples. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative examples disclosed above may be altered or modified and all such variations are considered within the scope and spirit of those examples. If there is any conflict in the usages of a word or term in this specification and one or more patent(s) or other documents that may be incorporated herein by reference, the definitions that are consistent with this specification should be adopted.

What is claimed is:

1. A method for identifying cuttings volume comprising:
   taking one or more inlet measurements of a drilling fluid at an inlet meter before the drilling fluid is circulated into a wellbore, wherein the one or more inlet measurements comprise a mass in and a volume in of the drilling fluid;
   taking one or more outlet measurements of a drilling fluid at an outlet meter after the drilling fluid is returned from the wellbore with cuttings, wherein the one or more outlet measurements comprise a mass out and a volume out of the drilling fluid;
   subtracting the one or more inlet measurements from the one or more outlet measurements and adding hole fill to determine mass of the cuttings;
   identifying a density of the cuttings; and
   converting the mass of the cuttings to the volume of the cuttings using the density of the cuttings.

2. The method of claim 1, wherein the one or more inlet measurements and one or more outlet measurements are taken by one or more sensors configured to measure mass and volume flow with density at the inlet meter or the outlet meter.

3. The method of claim 1, wherein the mass of the cuttings is found from a bulk density.

4. The method of claim 1, wherein the identifying the density of the cuttings is found from estimating a bulk density from an element or a mineralogical tool.

5. The method of claim 1, wherein the identifying the density of the cuttings is found from using lithology with an average formation density.

6. The method of claim 1, wherein the identifying the density of the cuttings is found from using lithology with a minimum and maximum formation density.

7. The method of claim 1, further comprising issuing an alarm if the volume of the cuttings is outside of a calculated range.

8. The method of claim 1, wherein the identifying the drilling fluid flowing out of a drilling system is found by subtracting replacement drilling fluid from the mass and the volume of the drilling fluid and adding the mass of the cuttings.

9. The method of claim 1, wherein the hole fill is a function of bit size, reamer size, and rate of penetration.

10. The method of claim 9, wherein the hole fill is equal to the mass of the cuttings.

11. A system comprising:
    an inlet meter, configured to take one or more inlet measurements of a drilling fluid at an inlet meter before the drilling fluid is circulated into a wellbore, wherein the one or more inlet measurements comprise a mass in and a volume in of the drilling fluid;
    an outlet meter configured to take one or more outlet measurements of a drilling fluid at an outlet meter after the drilling fluid is returned from the wellbore with cuttings, wherein the one or more outlet measurements comprise a mass out and a volume out of the drilling fluid;
    a pump for circulating a drilling fluid and one or more cuttings through the inlet meter and the outlet meter; and
    an information handling system configured to:
        subtract the one or more inlet measurements from the one or more outlet measurements and adding hole fill to determine mass of the cuttings;
        identify a density of the cuttings; and
        convert the mass of the cuttings to the volume of the cuttings using the density of the cuttings.

12. The system of claim 11, wherein the one or more inlet measurements and one or more outlet measurements are taken by one or more sensors configured to measure mass and volume flow with density at the inlet meter or the outlet meter.

13. The system of claim 11, wherein the information handling system is configured to identify the mass of the cuttings from a bulk density.

14. The system of claim 11, wherein the information handling system is configure to identify the density of the cuttings from estimating a bulk density from an element or a mineralogical tool.

15. The system of claim 11, wherein the information handling system is configured to identify the density of the cuttings from using lithology with an average formation density.

16. The system of claim 11, wherein the information handling system is configured to identify the density of the cuttings using lithology with a minimum and maximum formation density.

17. The system of claim 11, wherein the information handling system is further configured to issue an alarm if the volume of the cuttings is outside of a calculated range.

18. The system of claim 11, wherein the information handling system is configured to identify drilling fluid flowing out of a drilling system by subtracting replacement drilling fluid from the mass and the volume of the drilling fluid and adding the mass of the cuttings.

19. The system of claim 11, wherein the hole fill is a function of bit size, reamer size, and rate of penetration.

20. The system of claim 19, wherein the hole fill is equal to the mass of the cuttings.

* * * * *